United States Patent [19]

Ying et al.

[11] Patent Number: 4,739,207
[45] Date of Patent: Apr. 19, 1988

[54] WEDGE LOCKING DEVICE IN A RADIALLY VENTILATED ROTOR

[75] Inventors: Sui-Chun Ying, Winter Springs; Robert T. Hagaman, Oviedo, both of Fla.

[73] Assignee: Westinghouse Electric Corp., Pittsburgh, Pa.

[21] Appl. No.: 17,305

[22] Filed: Feb. 20, 1987

[51] Int. Cl.$^4$ .............................................. H02K 3/48
[52] U.S. Cl. ..................................... 310/214; 310/51; 310/55; 310/64; 310/91
[58] Field of Search ................... 310/214, 215, 51, 91, 310/261, 52, 55, 57, 58, 59, 60 R, 64, 65, 198, 180, 184, 208

[56] References Cited

U.S. PATENT DOCUMENTS

| | | | |
|---|---|---|---|
| 2,917,644 | 12/1959 | Laffon | 310/55 |
| 3,110,827 | 11/1963 | Baudry | 310/55 |
| 3,119,033 | 1/1964 | Horsley | 310/64 |
| 3,139,550 | 6/1964 | Geer | 310/214 |
| 3,243,622 | 3/1966 | Whittlesey | 310/214 |
| 3,265,912 | 8/1966 | Baudry | 310/59 |
| 3,821,568 | 6/1974 | Gillet | 310/214 |
| 4,251,745 | 2/1981 | Germann | 310/214 |
| 4,369,389 | 1/1983 | Lambrecht | 310/215 |
| 4,547,688 | 10/1985 | Hammer | 310/52 |
| 4,547,690 | 10/1985 | Bath | 310/215 |

FOREIGN PATENT DOCUMENTS

| | | | |
|---|---|---|---|
| 0980398 | 12/1975 | Canada | 310/214 |
| 1095108 | 2/1981 | Canada | 310/215 |
| 0939908 | 11/1948 | France | 310/214 |
| 0026033 | 2/1980 | Japan | 310/214 |
| 0324041 | 8/1957 | Switzerland | 310/214 |

*Primary Examiner*—R. Skudy
*Attorney, Agent, or Firm*—D. C. Abeles

[57] ABSTRACT

A method and apparatus for locking the wedges used in a dynamoelectric machine having a radically ventilated rotor keys each wedge to its respective damper bar. By inserting a solid key in a selected keyway proximate to a point midway along the length of the rotor, and inserting split keys elsewhere, accumulated axial migration of the wedges relative to their respective damper bar is limited thereby ensuring adequate ventilation through the radically extending ducts.

10 Claims, 5 Drawing Sheets

WEDGE LOCKING DEVICE IN A RADIALLY VENTILATED ROTOR

BACKGROUND OF THE INVENTION

This invention relates generally to the ventilation of dynamoelectric machines, and more particularly to an improved method and apparatus for locking the wedges used in such machines having a radially ventilated rotor.

Large turbine generators are usually of the inner cooled construction in which a coolant gas, usually hydrogen, is circulated through ducts in the stator and rotor slots in direct thermal relation with the current-carrying conductors inside the ground insulation. A machine of this type having an improved ventilation system is disclosed and claimed in U.S. Pat. No. 3,110,827, issued Nov. 12, 1963, to R. A. Baudry, assigned to the assignee of the present invention, and incorporated herein by reference.

As described in that patent, more effective cooling of a large turbine generator is obtained by dividing the air gap transversely into a plurality of annular zones by baffle members disposed in the air gap and mounted on the rotor and the stator. Alternate zones are connected to the high pressure or discharge side of a blower mounted on the rotor shaft and the remaining zones are connected to the low pressure or entrance side of the blower. Radial ducts or passages in the rotor in each of them, permit the coolant gas to flow from the hydrogen source to the rotor winding. Thus, the blower pressure is used to force the gas through the rotor ducts in a plurality of short axial paths so that adequate gas flow is obtained and very effective cooling results.

As is well-known, it becomes increasingly difficult to circulate adequate quantities of cooling gas through the rotor ducts from one end of the rotor to the other or to the center as the length of a machine of this type is increased. This is primarily due to the necessarily small cross-sectional area of the ducts. As disclosed in the above-described patent, as well as in an improvement thereto disclosed in U.S. Pat. No. 3,265,912, which was issued to R. A. Baudry, assigned to the assignee of the present invention and incorporated herein by reference, the path of the cooling gas through the rotor ducts is divided into a plurality of relatively short longitudinal paths, and the pressure of the blower is utilized to cause the gas to flow through the short path so that an adequate flow of gas is readily obtained. For this purpose, the air gap is divided transversely into a plurality of annular zones by means of annular baffle members placed in the air gap and extending around the bore of the stator to form the annular zones.

Disposed in the bore of the stator, the rotor is separated from the stator by an annular air gap, and is supported by bearings mounted in the ends of a housing with gland seals being provided to prevent leakage of gas from the housing along the shaft. The rotor is also provided with longitudinal slots in its periphery for the reception of a field winding, the conductors of which extend longitudinally of the rotor and have circumferentially extending end turn portions which are supported against centrifugal forces by retaining rings of usual construction. The windings are insulated from the rotor core by insulating slot cells, with a suitable insulating member being placed at the top of the windings in each slot, and the slot being closed by wedges. A single conductor or damper bar may also be suitably placed between the insulating slot cell and the wedge as part of an amortisseur winding or starter winding.

In order to adequately cool the rotor so as to maximize its efficiency, the rotor is often provided with radial gas passages in each of the zones of the air gap. Thus, radial holes may be drilled through the wedges, damper bar, insulating slot cell, and through the conductors in each slot of the rotor to provide radial passages from the air gap communicating with the longitudinal gas ducts of the rotor winding. Several of these gas passages may be provided in each slot of the rotor in each of the zones of the air gap so that gas may flow from one zone of the air gap of an adjoining zone through the radial passages and longitudinal ducts of the rotor conductors. This flow of gas is effected by connecting alternate zones of the air gap to the high pressure side of the blower and connecting the remaining zones to the low pressure side of the blower, thereby maintaining a pressure differential between adjacent zones of the air gap to cause the desired gas flow through the rotor ducts.

One major problem that occurs in radially ventilated systems is relative movement of the components within each slot. All of the components are sufficiently constrained in the tangential direction by the walls of the slot. Nevertheless, the slot contents are capable of excessive migration axially due to thermal expansion and centrifugal forces caused during rotation. Since the bottom spacer, insulating slot cell, and conductors are continuous throughout the length of the rotor, their axial migrations relative to one another can be prevented through such conventional measures as brazing copper bosses to the bottom surface of each bottom strap at both ends. However, since conventional wedges must be of a short enough length to facilitate their wedging operation, and further since an axial gap must remain between adjacent wedges to allow for their thermal expansion, a possibility exists for the migration of the wedges toward one end of the rotor or the other with an excessive accumulated gap. This situation could cause the closure of the radial holes, thereby obstructing the flow of the required coolant gas.

At both ends of the rotor, the top spacer and the damper bar are axially held in place against the retaining ring and its liner with a small axial clearance. The radial holes formed in each of the contents of the slot, with the exception of the wedge, are sufficiently elongated to accommodate their limited movement during rotation. The entire slot contents (except the wedge) are adequately supported against centrifugal loading. Because the wedges are subjected to high stresses in order to support the centrifugal loading of the slot contents, too long or too many holes to ensure proper ventilation would reduce the strength of the wedge significantly. It would, therefore, be desirable to provide a method and apparatus for locking the wedge segments of a radially ventilated rotor in order to minimize their axial migration.

Other methods and apparatus which lock the wedge segments in place have been proposed in the past. For example, the wedge segments could be locked by prick-punching the wedge material into the tooth top of the rotor slot or vice versa. Not only is such prick-punching capable of bending or damaging the tooth detrimentally, but also catastrophic failure of the tooth is engendered because of the high stress to which the tooth top is subjected. Application of radial set screws between the wedge and tooth top has also been considered. However, potential loosening and loss of the set screws within the operating generator necessitates their elimination in a suitable locking means.

SUMMARY OF THE INVENTION

Accordingly, it is a general object of the present invention to provide an improved method and apparatus for supporting the centrifugal loading of the contents of a rotor slot.

More specifically, it is an object of the present invention to provide an improved method and apparatus for locking wedge segments used to close off the upper end of a rotor slot.

It is another object of the present invention to provide an improved method and apparatus for locking wedge segments of a radially ventilated rotor in the rotor's slot to limit their axial migration.

Briefly, these and other objects of the present invention are accomplished in a dynamoelectric machine comprising a stator, a rotor centrally disposed on a shaft for rotation within the stator, the rotor including an outer body portion having a plurality of longitudinal slots containing field winding conductors, a plurality of damper bars, each of which is mounted within a respective slot, and wedge means closing the upper end of each slot, the wedge means including locking means for restricting movement of the wedge means relative to its respective damper bar. The contents of each slot of the dynamoelectric machine in accordance with the present invention suitably comprise radial ventilation means including an axial ventilating channel at the bottom of each of the slots, with a plurality of ventilating slots extending radially outward from the channel to the exterior of the rotor.

In accordance with one important aspect of the invention, the wedge means may comprise a plurality of wedge segments, each of said segment including an outer side adapted to fit flush with the exterior of the outer body portion and an inner side adapted to oppose its respective damper bar, wherein the inner side has formed therein at either end a semi-circular recess with a predetermined radius. Having a radius substantially similar to the predetermined radius of the semi-circular recess, the locking means comprises a key means adapted to mate the keyways with the semi-circular recesses. The key means may comprise either a solid key or a split key which are inserted within a plurality of circular keyways formed in the damper bar. By placing a first key in a selected one of the keyways of each of the damper bars proximate to a point midway along the length of each damper bar, an adjacent pair of segments may be suitably wedged against the key. Additional keys can be placed in each of the remaining keyways with their respective segments being wedged against them. As such with one key the possible accumulated axial migration of the wedge segments may be limited in either direction to half of the total clearance required for thermal expansion of all the wedge segments. In accordance with another important aspect of the invention, more than one key can be used thereby further limiting the accumulated axial migration.

Other objects, advantages, and novel features of the present invention will become apparent from the following detailed description of a preferred embodiment when considered with the accompanying drawings wherein:

DETAILED DESCRIPTION OF A PREFERRED EMBODIMENT

Figure 1:
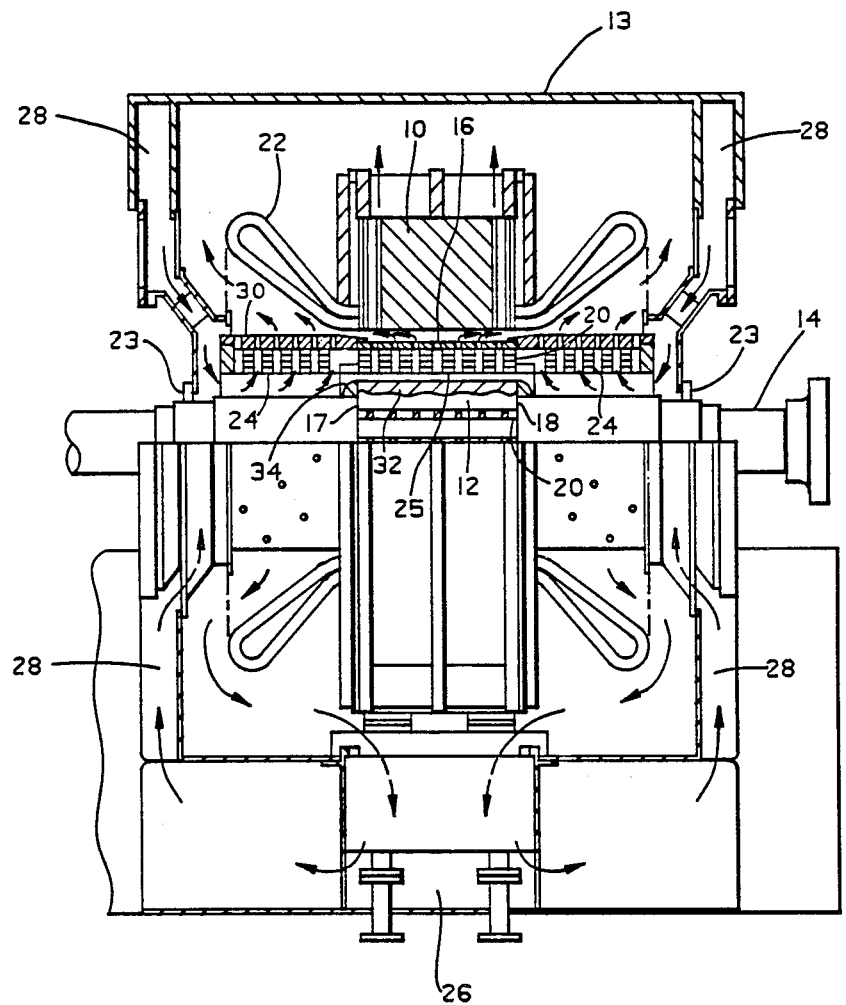
FIG. 1 is a general view partly in cross-section of a dynamoelectric machine in accordance with the present invention.

Referring now to the drawings, wherein like characters designate like or corresponding parts throughout the several views, there is shown in FIG. 1 a dynamoelectric machine which may be, for example, a large, hydrogen-cooled turbine generator. The generator, as is conventional, includes a stator 10 with a rotor 12 centrally disposed on a shaft 14 for rotation within the stator 10. The rotor 12 and shaft 14 can be forged together, but in any case the rotor 12 has an outer body portion 16 with axially opposing end faces 17 and 18 and a plurality of axially extending coil slots 20.

As previously stated, the housing 13 of the machine is made as nearly gas-tight as possible, and is sealed at the points where the rotor shaft 14 passes through it by the gland seals 23. The housing 13 is filled with a suitable coolant gas, preferably hydrogen, which is utilized for cooling the rotor 12 and the stator 10. A blower (not shown) may be mounted on the rotor shaft 14 adjacent one end of the machine for circulating the gas therethrough, and may be of any suitable type, such as a multi-stage blower of the axial flow type with the gas in the machine being maintained at a suitable static pressure, such as 30 to 75 pounds per square inch. In such a configuration, the blower develops sufficient differential pressure to maintain the desired circulation of gas within the housing 13 and throughout the various ducts in the manner described hereinafter.

As more fully described in the above-referenced U.S. Pat. No. 3,110,827, adequate gas flow through the ducts of the rotor winding is obtained by dividing the path of gas through the ducts into a plurality of relatively short longitudinal paths. The pressure of the blower is utilized to cause the gas to flow through these short paths. For this purpose, the air gap may be divided transversely into a plurality of gas zones by means of annular baffle or barrier members placed in the air gap and extending around the bore of the stator 10 to form the annular zones. Adjacent zones are maintained at different gas pressures to cause the gas to flow from one zone to the next through the rotor ducts. As shown by the arrows in FIG. 1, the coolant gas circulates through an inlet duct 28 an end turn portion 24 of the rotor winding. Part of the gas passes radially through radial passages in the end turns 22 and retaining ring 30. Remaining gas enters a channel 32 at the bottom of each slot 20 and out through radial passages in a slot portion 25 of the rotor winding, then axially out through the air gap and back to the blower.

Figure 2:
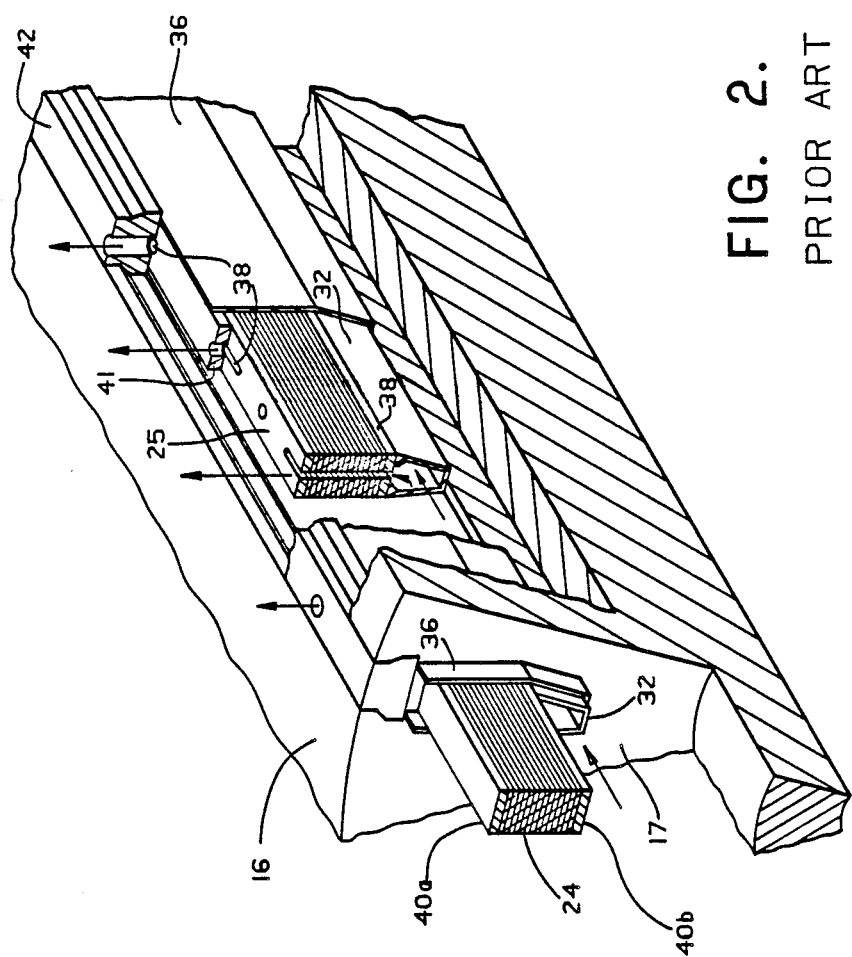
FIG. 2 is a perspective view with broken away elements of a ventilation arrangement for rotors in accordance with prior practice.

Referring now to FIG. 2, details of a prior art approach to ventilating the rotor 12 are shown. At the end face 17 of the rotor 12, an insulating slot cell 36 and a channel 32, which may be conductive, extend somewhat from the face, although not to the extent of the end turn portion 24, which are only generally shown in this view. The arrows illustrate the flow path including the axial flow through the channel 32 and radial flow through the radial ventilating ducts 38 that extend through the portion 25 of the rotor winding, insulating spacers 40a and 40b, damper bar 41, and slot wedge 42. With this structure, the axial channel 32 at the bottom of the rotor slots 20 serves as a manifold from which gas is bled off through radial ventilating ducts 38 cut in the rotor conductors. Each rotor slot 20 is completely lined below the wedge 42 with the insulating cell 36 and then the channel 32 is formed in the bottom of the slot 20 interior to the insulating cell 36. The continuous insulating cell thus provides a high integrity electrical insulation. In order to ensure the integrity of the insulation, it is a general practice to have the insulating cell 36 and the channel 32 extend beyond the rotor body 16 into the end turn area of the machine as shown. The rotor cooling gas must therefore enter the channel 32.

Figure 3:
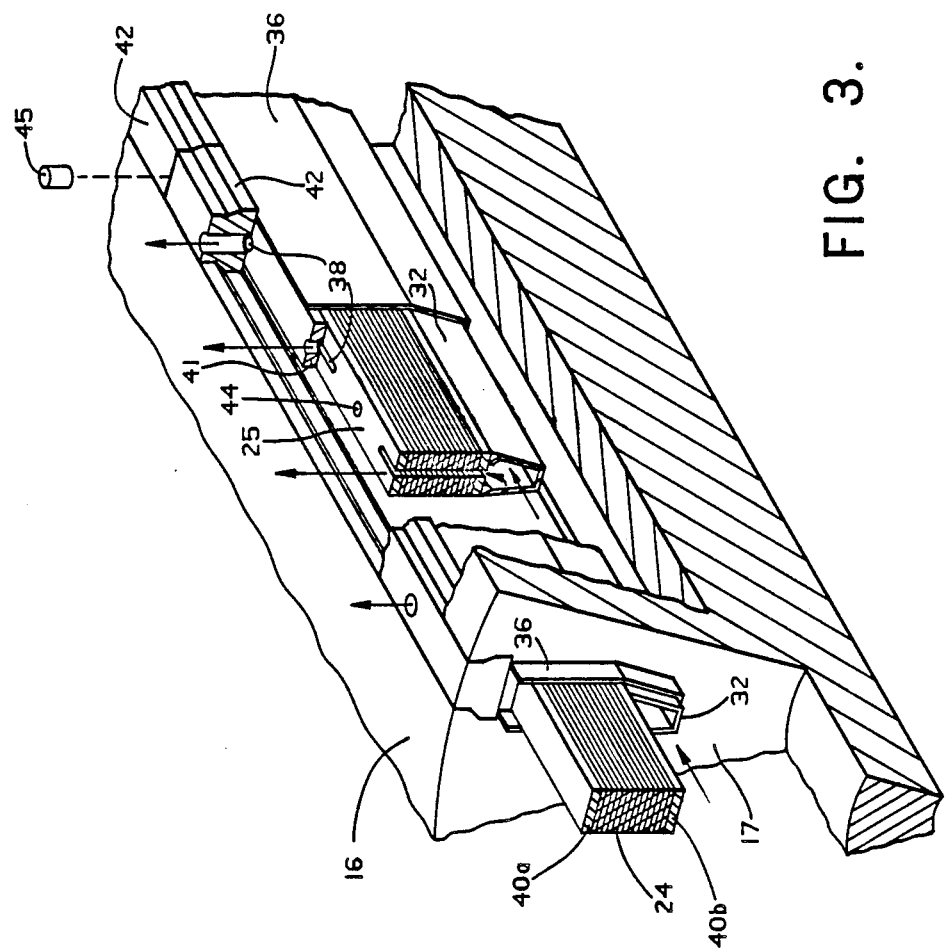
FIG. 3 is a perspective view with broken away elements of a wedge locking device for radially ventilated rotors in accordance with the present invention.

In an embodiment in accordance with the present invention as shown in FIG. 3, the elements of the structure of FIG. 2 are retained with minor modifications to prevent axial migration of the wedge segments 42 relative to the damper bar 41. As is conventional, the wedge segments 42 must be of a short length to facilitate their wedging operation. Furthermore, an axial gap (e.g., approximately 0.030 inches between wedges) is allowed for thermal expansion. Since, depending upon the length of the rotor 12, there may be from 10 to 20 wedge segments 42 separated by the required axial gap, migration of the wedge segments 42 during rotation of the machine could lead to an accumulated movement of between 0.3 and 0.6 inches. Such movement could also lead to the blockage of the radial ventilating ducts 38.

Figure 4:
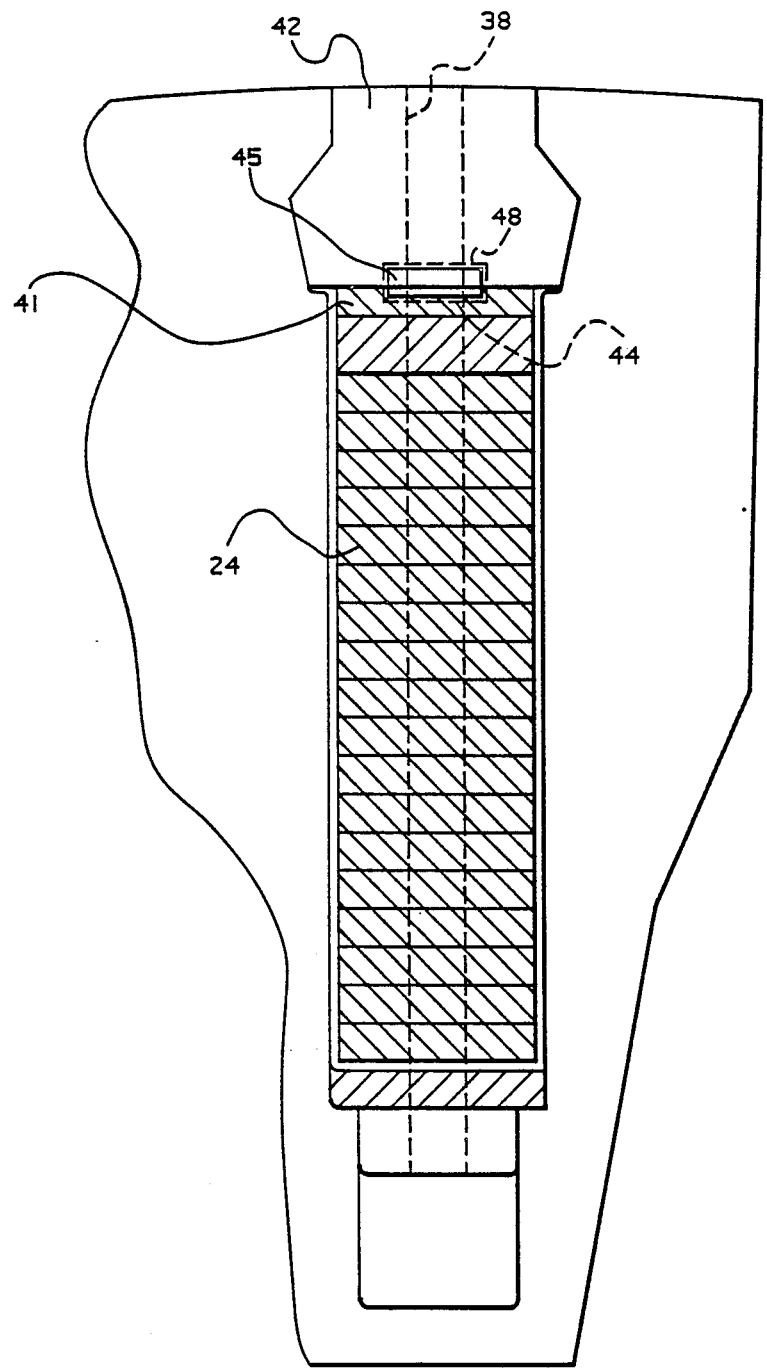
FIG. 4 is a cross-sectional view of the rotor slot contents shown in FIG. 3.
Figure 5:
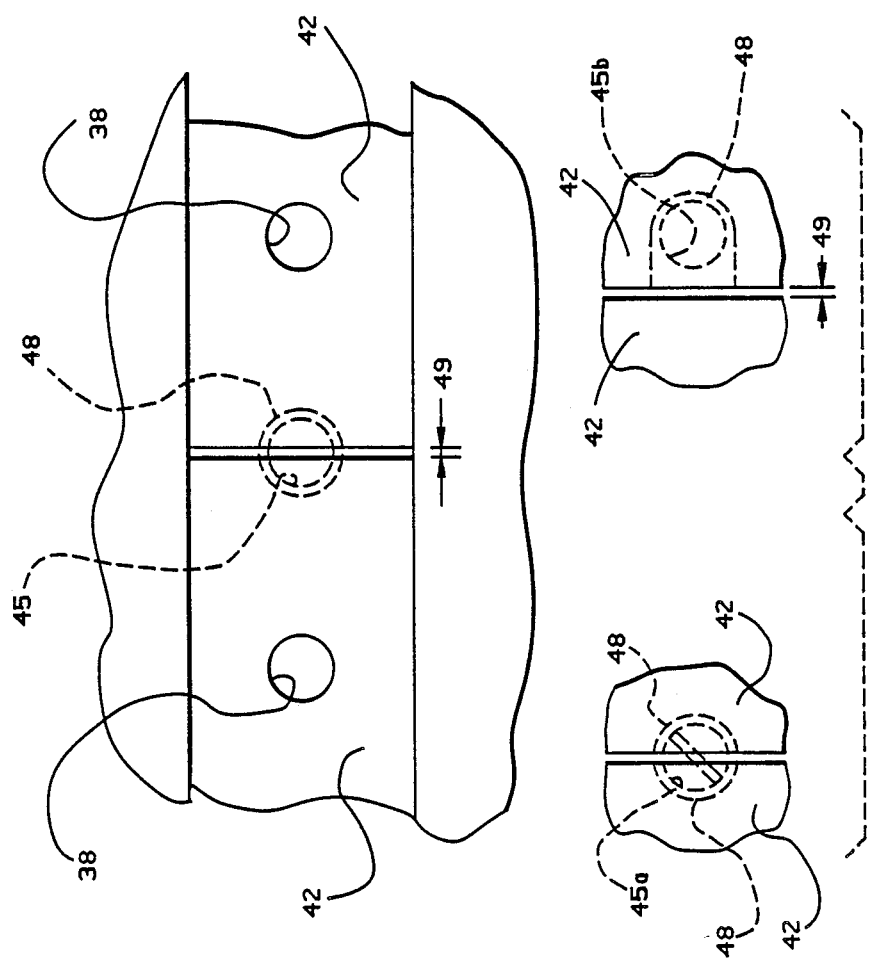
FIG. 5 is a plan view of a preferred method of locking the wedged segments of a radially ventilated rotor in accordance with the present invention.

As shown in FIGS. 4 and 5, axial migration of the wedge segments 42 causing blockage of the radial ventilating ducts 38 is prevented by keying the wedge segments 42 to the damper bar 41. A plurality of circular keyways 44 are formed in the upper side of the damper bar 41. A key 45 is inserted into one of the keyways 44, and a pair of wedge segments 42 with semi-circular recesses 48 formed at either end are brought into alignment with the key 45 thereby maintaining the gap 49 required for thermal expansion of the wedge segments 42. Thereafter, a key 45 is placed into the next semi-circular recess 48, a wedge segment 42 placed against it, and repeated until the coil slot 20 is completely covered by wedge segments 42.

In accordance with one important aspect of the invention, the key 45 may be inserted into a keyway 44 proximate a point midway along the length of the rotor 12. In each of the remaining keyways 44, if any, a split key 45a or a solid key 45b is inserted thereby reducing the accumulated potential movement of the wedge segments 42. With one key 45, the possible accumulated movement may be limited to half of the total distance represented by the gaps between the segments 42. If necessary, more than one key 45 can be used thereby further limiting the accumulated movement.

Obviously, many modifications and variations of the present invention are possible in light of the above teachings. It is therefore to be understood that within the scope of the appended claims, the invention may be practiced otherwise than as specifically described.

I claim as my invention:

1. A dynamoelectric machine, comprising:
    a stator;
    a rotor centrally disposed on a shaft for rotation within said stator, said rotor including an outer body portion having a plurality of longitudinal slots containing field winding conductors;
    a plurality of damper bars, each of which is mounted within a respective slot;
    wedge means closing the upper end of each slot, said wedge means including locking means for restricting movement of said wedge means relative to its respective damper bar, said wedge means comprising a plurality of wedge segments, each said segment including an outer side adapted to fit flush with the exterior of said outer body portion and an inner side adapted to oppose said damper bar, wherein said inner side has formed therein at either end a semi-circular recess with a predetermined radius; and
    radial ventilation means for cooling said rotor;
    wherein each said damper bar includes a plurality of circular keyways having radii substantially similar to said predetermined radius.

2. The machine according to claim 1, wherein said locking means comprises key means adapted to mate said keyways with said semi-circular recesses.

3. The machine according to claim 2, wherein said key means comprises:
    a solid key inserted in a selected one of the keyways of each said damper bar; and
    a plurality of keys inserted in each of the remaining keyways.

4. The machine according to claim 3, wherein said plurality of keys inserted in each of the remaining keys are selected from the group of solid keys and split keys.

5. The machine according to claim 3, wherein said solid key comprises a substantially cylindrical member having generally oblong-shaped planar surfaces.

6. The machine according to claim 3, wherein said selected keyway comprises the keyway proximate to a point midway along the length of each said damper bar.

7. An improved radially ventilated rotor of the type which includes an outer body portion having a plurality of longitudinal slots each containing field winding conductors, comprising:
    a plurality of damper bars, each of which is mounted within a respective slot above the conductors;
    an axial ventilating channel formed at the bottom of each of the slots;
    a plurality of ventilating ducts formed in the slot contents and extending radially outward from said channel to the exterior of the rotor; and
    wedge means closing the upper end of each slot, said wedge means including a plurality of segments and locking means for restricting movement of said segments relative to its respective damper bar, each said segment including an outer side adapted to fit flush with the exterior of the outer body portion and an inner side adapted to oppose said damper bar, wherein said inner side has formed therein at either end a semi-circular recess with a predetermined radius;
    wherein each said damper bar includes a plurality of circular keyways having radii substantially similar to said semi-circular recesses.

8. The improved rotor according to claim 7, wherein said locking means comprises key means adapted to mate said keyways with said semi-circular recesses, said key means including a solid key inserted in a selected one of the keyways of each said damper bar and a plurality of split keys inserted in one or more of the remaining keyways.

9. The improved rotor according to claim 8, wherein said solid key comprises a substantially cylindrical member having generally oblong-shaped planar surfaces.

10. The improved rotor according to claim 8, wherein said selected keyway comprises the keyway proximate to a point midway along the length of each said damper bar.

* * * * *